Figure 1:
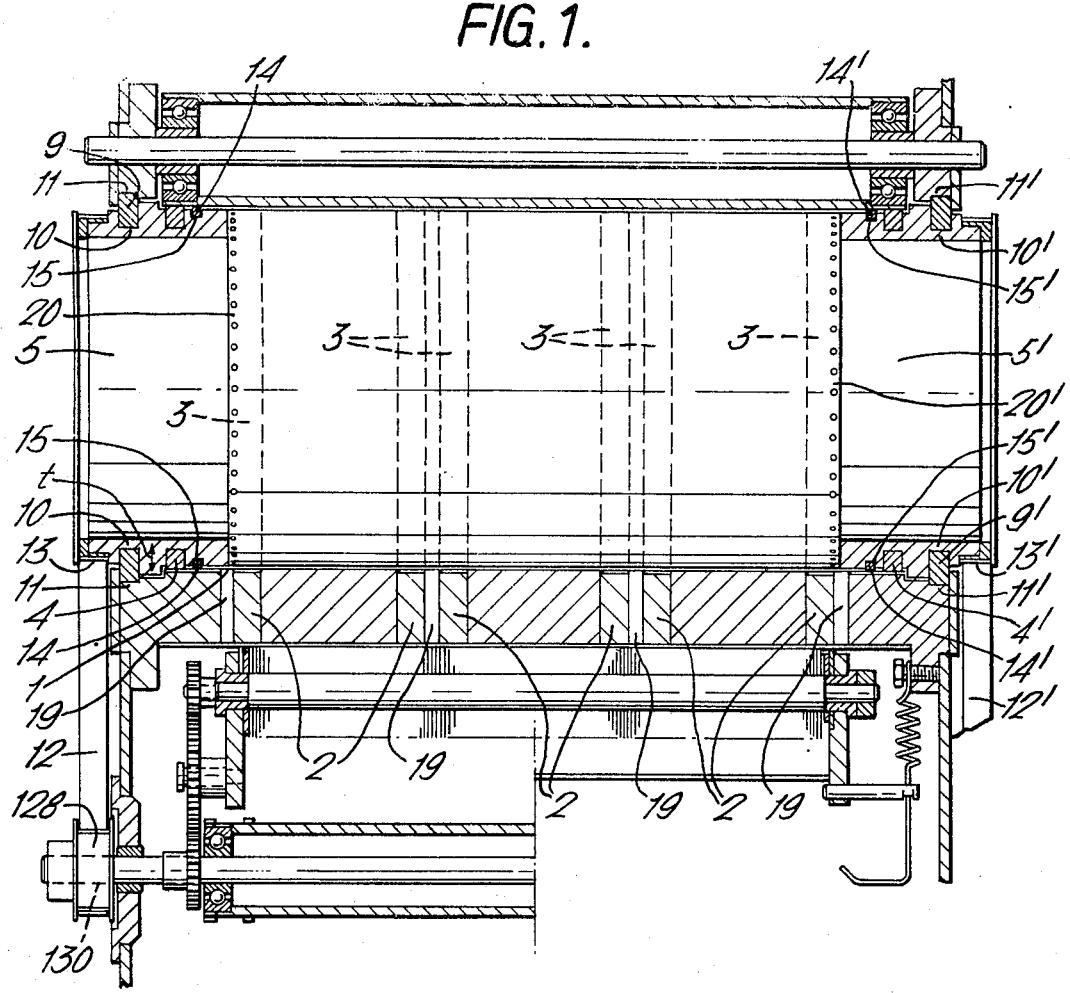
Figure 3:
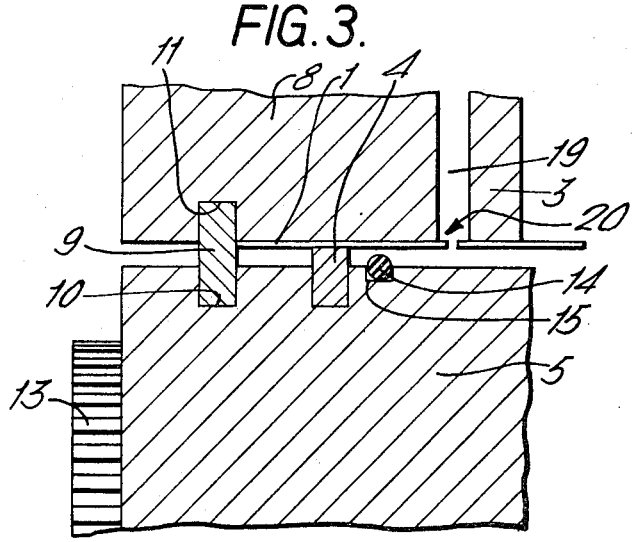
Figure 4:
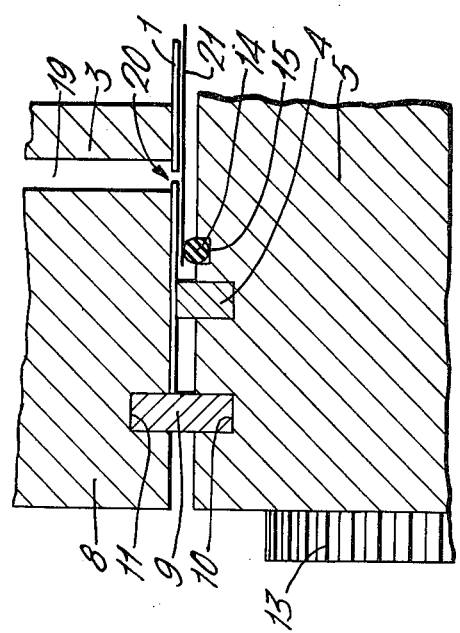

United States Patent [19]
O'Riley

[11] 3,912,146

[45] Oct. 14, 1975

[54] APPARATUS FOR SUPPORTING A LENGTH OF SHEETING AT A WORKING SITE

[75] Inventor: Kenneth Walter O'Riley, Surrey, England

[73] Assignee: Vickers Limited, London, England

[22] Filed: July 29, 1974

[21] Appl. No.: 492,782

[52] U.S. Cl. .................................. 226/95; 226/171
[51] Int. Cl.² ........................................ B65H 17/24
[58] Field of Search .......... 226/95, 171, 91; 360/84, 360/85; 101/117, 118

[56] References Cited
UNITED STATES PATENTS
1,955,813   4/1934   Klappenecker .......... 226/171 UX
3,265,267   8/1966   Wallin ................................... 226/91

Primary Examiner—Richard A. Schacher
Attorney, Agent, or Firm—Thomas C. Wettach; Arland T. Stein

[57] ABSTRACT

A length of sheeting is gripped between a support belt and associated gripping means arranged to circulate together through a working site in which the belt is constrained to define a concave support surface for the length and the gripping means hold that length against the support surface.

12 Claims, 8 Drawing Figures

APPARATUS FOR SUPPORTING A LENGTH OF SHEETING AT A WORKING SITE

This invention relates to apparatus for supporting a length of sheeting at a working site.

A method of cutting a duplicating stencil has been proposed in which a length of stencil-sheet material is supported in a cylindrically-curved disposition and an electrical stencil-cutting stylus is rotated around the axis of cylindrical curvature of the length so that the stylus effects cutting at the inner, concave face of the length. To hold the length of sheeting in the required cylindrically-curved disposition, the length can be supported against a concave cylindrical support surface under the action of suction applied to the length by way of apertures provided in the support surface.

Successive lengths of stencil-sheet material may be drawn off in succession from a continuous roll thereof through the stencil-cutting site defined by such a support surface, so that each length assumes in turn the required cylindrically-curved disposition automatically, suction being continuously applied to the sheeting as successive lengths thereof are drawn through the stencil-cutting site. To aid retention of the sheeting against the concave cylindrical support surface therefor opposite longitudinally-extending lateral edge regions of each length of sheeting may be arranged to engage in respective circumferentially-extending channels bounding the opposite axial sides of the support surface. These channels are formed so that air can be sucked, from that side of a length of sheeting at the stencil-cutting site which is remote from the support surface, around the respective lateral edge regions of the length, and under the length into the apertures provided in the support surface.

Where such circumferentially-extending channels are provided for the lateral edge regions of successive lengths of sheeting when at the stencil-cutting site, the introduction of a leading length of the sheeting into the side so as to assume the required cylindrically-curved disposition may be hindered by such lateral edge regions being caught in the channels. This difficulty may be enhanced when it is required to introduce one length of sheeting into the stencil-cutting site in face-to-face contact with another such length, for example in the case of stencil-sheet material to be backed at that site by suitable backing-sheet material. Similar difficulties may arise when trying to feed lengths of other types of sheeting, for example flexible lithographic printing-blank material or flexible facsimile-blank material, into a working site so as to be supported in analogous manner.

The present invention is aimed at overcoming difficulties such as described in the preceding paragraph.

The present invention provides sheet-support apparatus comprising:
 an endless support belt;
 a support structure defining a working site having entry and exit locations for the entry and exit, respectively, of a length of sheeting to be supported at the site;
 carrier means mounting the said support belt on the said support structure for circulation, from the entry location to the exit location, through the working site, constraining the belt to define a concave support surface for such a length of sheeting at that site, and enabling the belt to circulate back from the exit location to the entry location externally of of the working site along a first path; and
 gripping means supported by the said carrier means for simultaneous circulation with the said support belt through the working site adjacent to the said concave support surface and enabling the gripping means to circulate back from the exit location to the entry location externally of the working side along a second path which diverges from the said first path at a sheet-removal location but subsequently converges towards the said first path at a sheet-insertion location, thereby permitting such a length of sheeting to be inserted between the support belt and the gripping means at the sheet-insertion location and carried, held against the support belt by the gripping means, by such simultaneous circulation into the working site to be supported against the said concave support surface.

It will be appreciated that the sheet-insertion location may coincide with the entry location, and the sheet-removal location with the exit location.

So that the support belt of apparatus embodying the invention is constrained to define at the working site a concave support surface of substantially uniform cross-section transverse to a given axis about which the belt is arranged to circulate through the site, opposite lateral edge regions of the belt may be arranged to extend, at the working site, around and against respective rigid support members with like, mutually-coincident cross-sections, transverse to the given axis, which determine the cross-section of the concave support surface. Where the required concave support surface is to be cylindrical, these support members may take the form of respective coaxially-arranged cylindrical members. Such cylindrical members may be rotatable so as to drive the belt along its path of circulation, the members in this case being provided with respective annular surface portions which engage respective opposed portions of the lateral edge regions of the belt with a degree of friction sufficient for the belt to be caused to rotate with the cylindrical members. Such annular surface portions may respectively be provided by drive bands of resilient material, for example rubber, arranged around the respective cylindrical surfaces of the cylindrical members.

The gripping means of apparatus embodying the invention may comprise one or more flexible gripping bands arranged to circulate through the working site of the apparatus adjacent to the support surface defined by the support belt at the working site. Where the belt is, as described above, constrained to define a concave cylindrical support surface at the working site by means of a pair of coaxially-arranged rotatable cylindrical members for driving the belt, the gripping means may comprise flexible gripping bands that respectively extend around the cylindrical members so as to rotate therewith. Where the cylindrical members are provided with drive bands, the gripping bands should be located, between the respective drive bands extending around the cylindrical members, at positions such that a length of adequately wide sheeting to be supported against the concave support surface provided by the support belt at the working site has its lateral edge regions gripped respectively between the gripping bands and the lateral edge regions of the support belt but not between the drive bands and those regions of the belt.

Located between a pair of rotatable cylindrical members such as mentioned above, there may be provided cylindrically-curved support means, for example parallel curved support ribs, against which the non-extreme regions of the belt can be supported in the required cylindrically-curved disposition at the working site. To aid retention of a length of sheeting against the concave support surface provided by the belt, the belt may be provided with apertures therein, for example running in rows along the respective lateral edge regions thereof, whereby suction can be applied to the length of sheeting so as to draw it against the concave support surface.

Since, being gripped between the support belt and the associated gripping means of an apparatus embodying the invention, a length of sheeting being carried through the working site of the apparatus does not move relative to the belt, problems such as may arise when a length of sheeting is drawn into a working site against a stationary support surface can be avoided.

If successive lengths of sheeting are to be drawn in turn from a continuous roll thereof through the working site of an apparatus embodying the invention in which the support belt is provided with suction apertures and the gripping means comprise respective gripping bands extending around coaxially-arranged rotatable cylindrical drive members around and against which respective lateral edge regions of the belt are arranged to extend so that the belt is constrained to define a concave cylindrical support surface at the working site, only the leading length of the sheeting need be of greater width than the axial distance between the gripping bands. This is because once the leading length of sheeting has been carried through the working site by being gripped between the gripping bands and the support belt succeeding lengths of sheeting that are of width less than this distance can be retained against the support surface by suction applied to the length of sheeting by way of the suction apertures in the belt. With such an apparatus, adjacent lengths of sheeting in face-to-face contact with one another can be supported together in cylindrically-curved manner at the working site or drawn together therethrough. For this, the widths of both lengths of sheeting may be chosen to be greater than the axial distance between the gripping bands. Alternatively, if suction apertures are provided in that one of the lengths of sheeting which lies directly against the support belt, the other length of sheeting may be of smaller width than this axial distance so that, instead of itself being gripped between the support belt and the gripping bands, it is retained by suction against the length of sheeting lying directly against the support belt.

Where successive lengths of comparatively flimsy sheeting are to be drawn through the working site of an apparatus embodying the invention such as described in the previous paragraph, the sheeting may be provided with a leading length of a more robust material wide enough to be gripped between the support belt and the gripping bands and long enough to allow the flimsier material to be drawn into the working site; in this case, the flimsy material may have a width narrower than the axial distance between the gripping bands and be retained against the support belt by suction rather than by gripping between the belt and the gripping bands.

Where it is desired that lengths of sheeting of different widths should be supportable against the concave support surface defined by the endless support belt of apparatus embodying the invention at the working site thereof, the gripping means of the apparatus that are arranged to circulate through the working site with the support belt may comprise an endless transparent belt that is co-extensive with the support surface defined by the support belt at the workin site. Where the required concave support surface is cylindrical, for example, a document or other sheet-form original having a surface to be scanned can be supported at the working site, between the support belt and the transparent belt, so that the surface to be scanned extends in cylindrically concave manner adjacent to the transparent belt, thereby permitting scanning of that surface by a rotary scanning head mounted for rotation at the working site about the axis of curvature of the concave support surface defined by the support belt. Only the degree to which the concave support surface defined by the support belt at the working site and the adjacent surface of the transparent belt thereat are co-extensive in the direction of the axis about which these belts circulate through the site sets an upper limit to the width of documents etc. which can be handled by the apparatus.

Where the gripping means of apparatus embodying the invention comprise an endless transparent belt such as described in the preceding paragraph, this belt being composed of flexible sheet-form plastics material for example, circulation of the transparent belt through the working site of the apparatus with the support belt may be achieved with the aid of gripping bands arranged similarly to those mentioned previously. In this case, however, these gripping bands circulate through the working site adjacent, not to the concave support surface defined by the support belt at that site, but to the adjacent surface of the transparent belt, so that the transparent belt is gripped (preferably at lateral edge regions thereof) between the gripping bands and the support belt and thus circulates with the latter.

For a better understanding of the invention and to show how it can be carried into effect, reference will now be made, by way of example, to the accompanying diagrammatic drawings, in which:-

Figure 2:
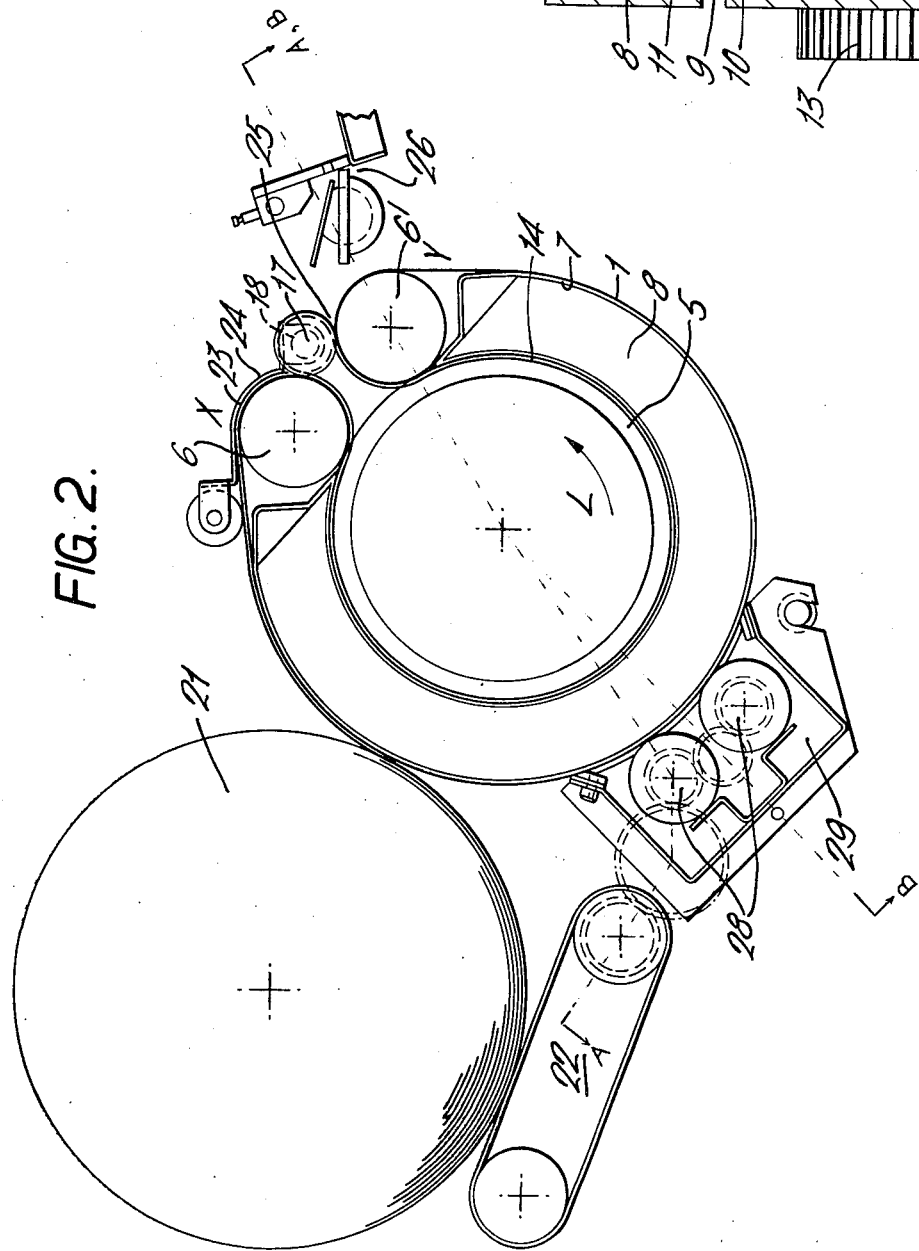
Figure 5:
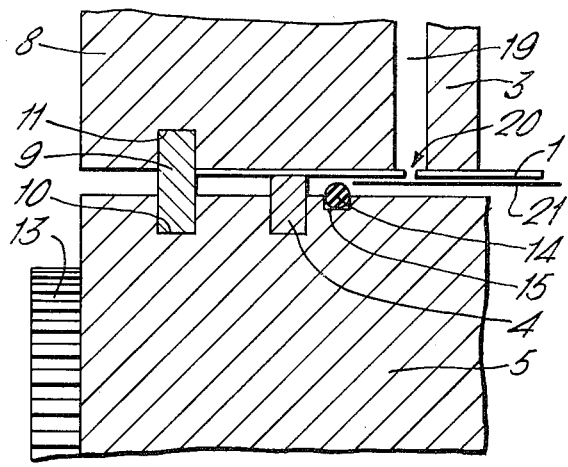
Figure 6:
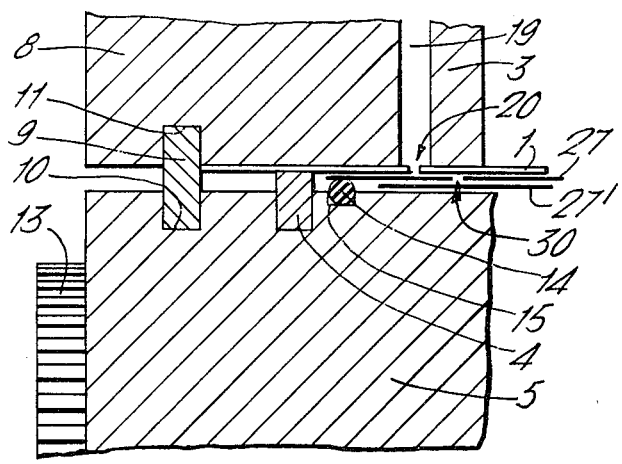
Figure 7:
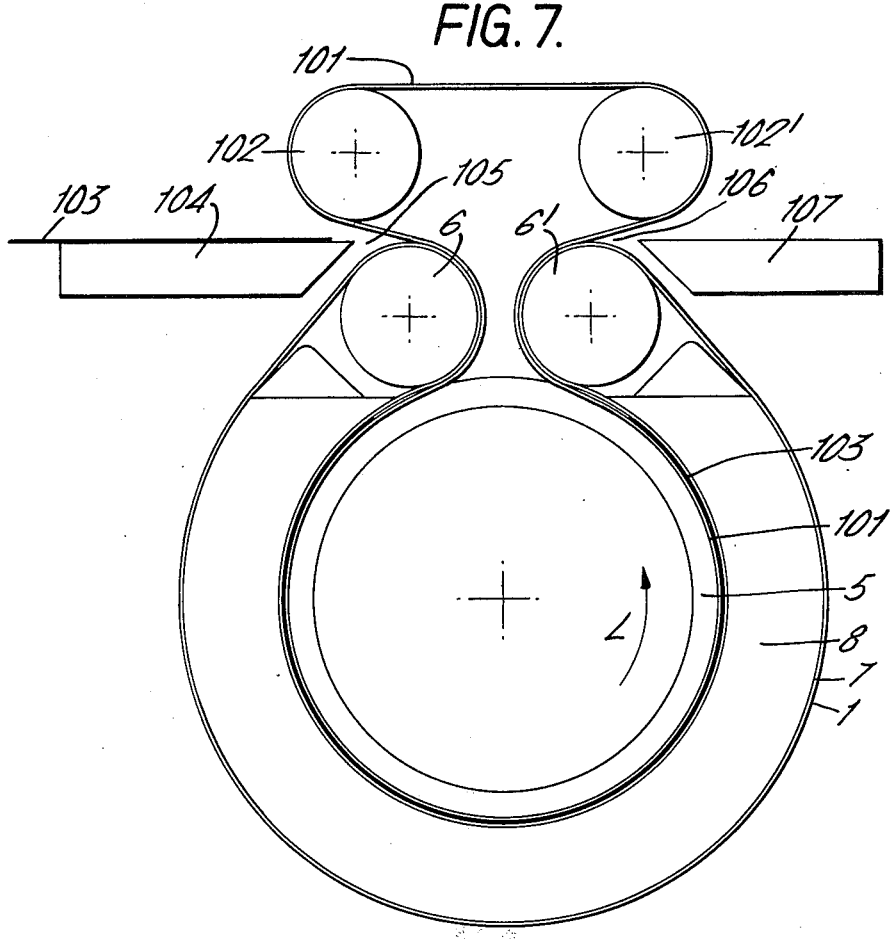
Figure 8:
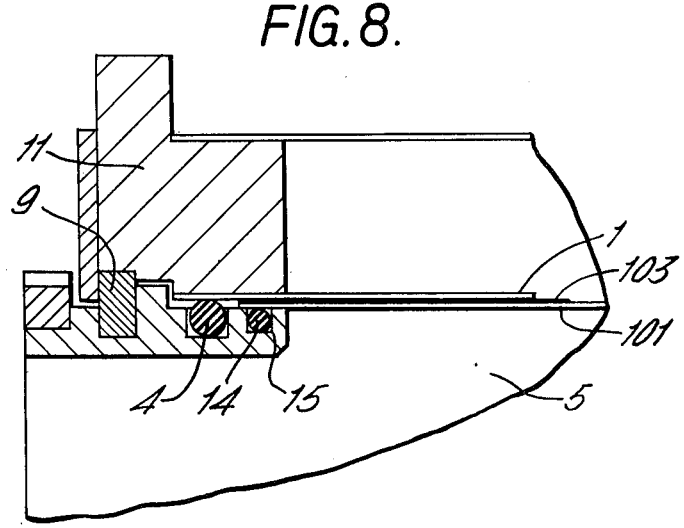

FIG. 1 is an axial sectional view of part of an apparatus embodying the invention, the apparatus being half sectioned along the line AA of FIG. 2 and half sectioned along the partly coincident line BB thereof, FIG. 2 is a radial sectional view of the apparatus illustrated in FIG. 1, FIGS. 3 to 6 are respective like fragmentary sectional views of this apparatus in schematic form illustrating respective modes of operation of the apparatus, FIG. 7 is an axial sectional view of part of a modification of such apparatus, and FIG. 8 is a fragmentary sectional view, similar in nature to those of FIGS. 3 to 6, of the modified apparatus.

The apparatus illustrated in FIGS. 1 to 6 may for example be employed for retaining a length of stencil-blank material in a cylindrically-curved disposition so that stencil-cutting may be effected at the cylindrically-curved concave surface thereof by a rotary electrical stencil-cutting stylus mounted to rotate about the axis of cylindrical curvature of the retained length. The apparatus comprises an endless flexible support belt 1 arranged to circulate around two mutually-spaced parallel idler rollers 6 and 6' and within a cylindrical cage 2 defined by a plurality of co-axial like cylindrical ribs 3, the belt being arranged to pass from outside the cage 2 over the roller 6 into the cage at an entry location adjacent to the roller 6, to pass from within the cage 2 around the roller 6 to outside the cage at a exit location adjacent to the roller 6', and back towards the roller 6 along a path external of the cage 2, which leaves the space between the rollers 6 and 6' free.

The length of the support belt 1 at any time within the cage 2 is constrained to extend around the internal surface thereof in cylindrical manner by carrier means for the belt in the form of two cylindrical end-caps 5 and 5' disposed respectively coaxially relative to one another at opposite axial ends of the cage in such manner that respective lateral edge regions of the support belt pass around and against the cylindrical surfaces of the respective end-caps 5 and 5' when the belt is within the cage 2.

There extends coaxially around the outside of the cage 2 a cylindrically-curved support plate 7 whose outer cylindrical surface supplies a support surface for the support belt 1 when outside the cage 2. Together, the cage 1 and the cylindrically-curved support plate 7 form a rigid cylinder assembly 8, serving as a support structure for the carrier means constituted by the end-caps 5 and 5', whose axis of curvature coincides with that of the cage 2 and the support plate 7. The surfaces of the ribs 3 over which the support belt 1 passes are preferably coated with a low-friction material, for example polytetrafluoroethylene, thereby facilitating the passage of the belt over these surfaces. The belt is arranged to rest relatively loosely upon the outer surface of the cylindrically-curved support plate 7; however this surface may also be coated with low-friction material (for example polytetrafluoroethylene again) if desired.

The cylindrical end-caps 5 and 5' are mounted so as to be respectively rotatable about the axis of the cylinder assembly 8 in bearings respectively formed by split-ring inserts 9 and 9', the insert 9 of which is retained in opposed grooves 10 and 11 respectively formed around the outer periphery of the end-cap 5 and around the inner periphery of an opposed portion of the cylinder assembly 8, the split ring insert 9' being retained in opposed grooves 10' and 11' respectively formed around the outer periphery of the end cap 5' and around the internal periphery of the cylinder assembly 8. The axially outermost ends of the end-caps 5 and 5' are respectively provided with serrated driving portions 13 and 13' whereby toothed belts 12 and 12' respectively engaging with the driving portions 13 and 13' are arranged to drive the end-caps from a toothed pinion 128 mounted on a drive shaft 130. Axially inwards of the respective locations of the grooves 10 and 10', the end-caps 5 and 5' are respectively provided with further outer peripheral grooves in which two drive bands 4 and 4' are respectively retained in such manner as to project slightly from the respective cylindrical surfaces of the end-caps (see for example FIG. 3). The drive bands 4 and 4' are made of rubber or other resilient material. The width of the support belt 1 is such that the opposite lateral edge regions thereof within the cage 2 extend between the internal cylindrical surface of the cylinder assembly 8 and the respective drive bands 4 and 4'. The pressure exerted on the support belt 1 by the driving bands 4 and 4' as a result of their resilience is such that upon rotation of the end-caps 5 and 5' from the drive shaft 130 the endless support belt 1 is driven by the drive bands 4 and 4' so as to circulate through the working site defined by the interior of the cylinder assembly 8.

The support belt 1 may be a thin metal sheet, for example a length of 0.003 inch steel bonded to thin terylene sheeting by a suitable adhesive with the two ends of the length butting together. Other metals, for example stainless steel, brass or aluminium, could however be used for this purpose and alternative joining techniques employed to close the belt, for example welding or brazing.

Axially inwards of the respective locations of the drive bands 4 and 4' the end-caps 5 and 5' are respectively provided with further outer peripheral grooves 15 and 15' which respectively receive two endless gripping bands 14 and 14' made of resilient material such as rubber. Unlike the drive bands 4 and 4', the gripping bands 14 and 14' are not confined to the respective grooves 15 and 15' for the whole of the circumferential extend of these grooves but respectively pass away from these grooves at the locations where the support belt 1 departs from being of circular internal cross-section. From these points respective loops of the gripping bands 14 and 14' pass between the space between the rollers 6 and 6' so as to be received in respective grooves 17 extending around a roller 18 which is in rolling contact with the rollers 6 and 6' at the entrance to the cage 2. The tension in the gripping bands 14 and 14' is such that as the end-caps 5 and 5' are driven so as to rotate in the direction indicated by the arrow L in FIG. 2, the drive bands 4 and 4' drive circulation of the support belt 1 at the same rate as the end-caps 5 and 5' drive rotation of the gripping bands 14 and 14'. Thus the gripping bands 14 and 14' are stationary relative to the support belt 1 within the cage 2. The circulation of the gripping bands 14 and 14' causes rotation of the roller 18 in the same sense as the movement of these bands, the idler rollers 6 and 6', which respectively serve as feed-in and feed-out rollers, correspondingly rotating in the opposite sense.

To hold that length of the support belt 1 which is within the cage 2 at any time against the ribs 3 so that the central regions of this length take up the required cylindrical curvature as well as the lateral edge regions of the length do as a result of their passage around the end-caps 5 and 5', the gaps 19 between adjacent ones of the support ribs 3 are provided with connections permitting these gaps to be pumped so that this length of the belt is drawn against the ribs 3 under the action of suction applied to the length via the gaps 19. Axially inwards of the respective locations of the gripping bands 14 and 14', the lateral edge regions of the support belt 1 are respectively provided with longitudinally-extending rows of suction apertures 20 and 20' whereby this suction effect can be communicated through the belt itself.

A reel or roll of sheeting 21 successive lengths of which it is required to introduce into the cylinder assembly 8 in turn for respective operations on those lengths when retained in a cylindrically-curved disposition within the cylinder assembly is located on a moving-belt platform 22, arranged parallel to the cylinder assembly 8 at one side thereof, so as to bear against the outer surface of the support belt 1. The width of the sheeting 21 is less than the axial distance between the drive bands 4 and 4' but, at least in the case of a leading length of the sheeting, greater than the axial distance between the gripping bands 14 and 14' (see FIG. 4).

The leading length of the sheeting 21 is drawn from the reel or roll thereof over the outer surface of the support belt 1 until the leading edge portion 23 of this leading length (see FIG. 2) is located at the nip between the rollers 6 and 18. Upon actuation of a drive motor to rotate the drive shaft 130, the support belt 1 and the gripping bands 14 and 14' will, in the vicinity of the nip between the rollers 6 and 18, start to move together at the same rate into the interior of the cylinder assembly 8, gripping between them as they do so the leading length of the sheeting 21. As a result the leading length of the sheeting 21 is carried into the cylinder assembly 8 so as to assume the cylindrical shape which the support belt 1 takes up within the assembly. Since the gripping bands 14 and 14' move at the same rate as the support belt 1 within the cage 2, the length of sheeting being drawn into the cage is not pulled across a stationary surface and so undue buildup of tension in this length is avioided. In due time, the leading edge portion 23 of the leading length of the sheeting 21 is carried round to the location of the nip between the roller 18 and the roller 6' whereafter, because the gripping bands 14 and 14' go on to travel around the roller 18 whereas the support belt 1 goes on to travel around the roller 6', the sheeting is no longer gripped between the gripping bands 14 and 14' and the support belt 1 but emerges freely from between this nip. As the sheeting 21 emerges from between the rollers 18 and 6', it passes towards a guillotine 26 permitting the leading edge portion 23 of the length to be trimmed off if required and successive lengths of the sheeting 21 emerging from the cylinder assembly 8 to be severed from the reel or roll of the sheeting.

Where the sheeting 21 comprises stencil-sheet material in the form of carbon-loaded tissue or plastics sheeting, and a rotary electrical stencil-cutting stylus is to be employed to effect cutting at the cylindrically curved inner surface of successive lengths of the stencil-sheet material when retained in the cylinder assembly 8, the cutting operation may tend to result in the adhesion of a tacky carbon deposit to the support belt 1 (which should in this case also serve as an electrically-conductive backing permitting the passage of stylus current through the stencil-sheet material between the stylus and the support belt). Cleaning means 27 comprising rotary cleaning brushes 28 supplied with suitable solvent by a bath 29 may therefore be arranged adjacent to the path of the support belt avoided. outside the cylinder assembly 8 so as to remove the carbon deposit from the belt before recirculation thereof through the interior of the cylinder assembly 8.

Once a fresh length of sheeting 21 has been drawn into position within the cylinder assembly 8, rotation of the end-caps 5 and 5' is stopped so that a required operation can be carried out on that length of sheeting. After this operation, the end-caps are caused to rotate again until the length has been carried out of the cylinder assembly 8 and a fresh length drawn into the assembly to replace the previous length. The length which has been operated upon can then be severed from the reel or roll of sheeting 21 by the guillotine 26.

If the endless support belt 1 has a join in it, it may be desirable to ensure that the join at no time lies within the interior of the cage 2. In the case of stencil-cutting, for example, where the stencil passed over a region of stencil-sheet material lying against the support belt 1 in the region of such a join, an image of the join might be superimposed on the image being cut into the stencil sheet material be the stylus. Accordingly, the internal and external diameters of the support belt 1 may be chosen so that any such join is always located, when the belt stops, behind the location where the belt passes into cylindrical shape or ahead of the location where the belt passes out of cylindrical shape. In one stopping position, for example, the join might be located above the roller 6, while the next time the belt is stopped the join might be located above the roller 6'. So that the belt always stops at such positions, a sensor device (not shown), for example a photocell, can be employed to control the drive motor by reference to suitable marks provided on the belt 1 or a member that moves simultaneously therewith. Such a sensor device could also be employed to control the emergence of sheeting from the cylinder assembly 8 following an operation within the assembly on a length of the sheeting. Such a sensor device may, in the application of the invention to stencil-cutting, control the feed of a length of cut stencil-sheet material from the cylinder assembly 8 towards a clamp device on a duplicator drum, which clamp device is operable to clamp the leading edge portion of the leading length of stencil-sheet material so that the length can be wound around the drum upon rotation thereof after severing (or, possibly, before severing) of the length from the rest of the stencil-sheet material by means of the guillotine 26.

Depending upon the nature of the sheeting 21, the load exerted by the gripping bands 14 and 14' on the respective lateral edge regions on the sheeting as it is retained in the cylinder assembly 8 may tend to cause curling of these edge regions. To avoid this, only the leading length of the sheeting need be of width sufficient to extend under the gripping bands 14 and 14', the remainder of the sheeting in this case being of reduced width so as not to underlie the gripping bands 14 and 14' within the cylinder assembly 8 (see FIG. 5). The succeeding lengths of sheeting of reduced width can then be retained in turn in the required cylindrically-curved disposition within the cylinder assembly 8 by virtue of suction applied to the sheeting through the rows of apertures 20 and 20' in the support belt 1. Initial loading of the cylinder assembly 8 may be facilitated if the sheeting 21, whether of reduced width or not, is provided with a leading sheet of relatively robust material wide enough to be gripped by the gripping bands 14 and 14' and long enough to complete the initial loading operation.

Whilst the apparatus illustrated in FIGS. 1 to 6 is intended primarily for use with sheeting at least the leading length of which is of width greater than the axial distance between the gripping bands 14 and 14', the apparatus can be used if necessary with sheeting of less than this width if the leading length of the sheeting is removably attached to the support belt 1, for example by adhesive tape, so as to allow the sheeting to be drawn into the cylinder assembly 8 when the belt is caused to circulate. In this case, upon emergence of the leading length, the length has to be detached from the belt, for example by removal of such tape if employed.

As indicated in FIG. 6, the apparatus illustrated in FIGS. 1 to 6 can be employed where it is desired that respective lengths of two webs of material should extend in face-to-face contact with one another in the cylinder assembly 8. In the application of the invention to stencil-cutting for example, it may be desired to back successive lengths of stencil-sheet material drawn into the cylinder assembly with respective lengths of backing-sheet material to complete the current path for stencil current passed through the stencil-sheet material between the stylus and the backing-sheet material. The two webs may be wound together in a single roll arranged like that illustrated in FIG. 2, or may come from respective rolls of material of which, for example, only the roll supplying the web intended to be supported directly against the support belt 1 is arranged like the roll illustrated in that figure. In the case illustrated in FIG. 6, the web 27 of material to be supported directly against the support belt 1 (e.g. backing-sheet material in the case of stencil-cutting) is of width greater than the axial distance between the gripping bands 14 and 14' whereas the other web 27' of material is narrower than this, the web 27' being retained against the adjacent web 27 by virtue of suction communicated to the web 27' by way of the rows of suction apertures 20 and 20' in the support belt 1 and rows of suction apertures 30 provided in the web 27 itself along the lateral edge regions thereof. Such rows of apertures 30 in the web 27 are not necessary, of course, if the web 27' is in any case attached to the web 27. It will be appreciated that only the leading length of the web 27 need be of greater width than the axial distance between the gripping bands 14 and 14', since subsequent lengths can be retained against the support belt 1 solely by the suction effect provided by the suction apertures 20 and 20'. This leading length may, by analogy with what has been described above, be of a material that is rather more robust than the following lengths of the web.

It will be understood that if the respective widths of the webs 27 and 27' are both greater than the axial distance between the gripping bands 14 and 14' the gripping of mutually adjacent lengths of the webs 27 and 27' between the support belt 1 and the gripping bands 14 and 14' should be sufficient in itself to retain these lengths, at least at the respective lateral edge regions thereof, in the required cylindrical disposition. On the other hand, even if mutually adjacent lengths of the webs 27 and 27' are both of width narrower than the axial distance between the gripping bands 14 and 14', the respective leading edge portions of the lengths can be attached to the support belt 1, for example with the aid of adhesive tape, and then drawn into the cylinder assembly 8 so as to be retained against the support belt 1 in the required cylindrically-curved disposition under the action of suction applied through the rows of suction apertures 20 and 20'. Such a method of loading involves the disadvantage that the leading edge portions of the respective adjacent lengths of the webs have to be detached from the support belt 1 upon emergence from the cylinder assembly 8. The technique is of value, however, where webs at least the leading lengths of which are greater in width than the axial distance between the gripping bands 14 and 14' cannot readily be obtained and where, if the apparatus is initially loaded with webs only the respective leading lengths of which are wider than this axial distance, adjacent lengths of the respective webs subsequently retained within the cylinder assembly 8 become severed at any time from the roll or rolls from which those webs are being supplied.

In addition to the application of the apparatus illustrated in FIGS. 1 to 6 to stencil-cutting, it will be appreciated that, more generally, the apparatus could be employed to hold successive lengths of sheeting in cylindrically-curved manner so that these lengths can be inscribed in turn by means of a rotary inscribing tool mounted within the cylinder assembly 8 to rotate about the axis thereof. Successive lengths of flexible sheet-form lithographic printing-blank material may be inscribed in this manner to provide respective lithographic printing plates, and successive lengths of flexible sheet-form facsimile-blank material may similarly be inscribed to produce facsimile copies. Such facsimile-blank material might for example comprise a two-layer material one layer of which is of different colour from the other and is locally removable therefrom by an inscription stylus either by the passage of stylus current through the material or by actual penetration of the stylus into the upper layer of the material; alternatively, the facsimile-blank material might be so-called electrolytic or electrothermal material which discolours locally upon the passage of current therethrough by means of an electrical inscribing stylus, or may comprise an image-receiving layer to which imaging pigment can be transferred from an adjacent layer of pigment-impregnated tissue by percussive application of a stylus, for example under electrical control, onto the pigment-impregnated tissue against the image-receiving layer.

Where a document or other sheet-form original which it is required to scan (for example, for reproduction purposes) is of sufficient width, apparatus such as illustrated in FIGS. 1 to 6 can be employed to hold it in a cylindrically-curved disposition with the surface to be scanned facing inwards, thereby permitting scanning of that surface by a rotary scanning head mounted for rotation about the axis of the cylinder assembly 8 as well as for displacement along that axis. For documents etc. that are too narrow for this apparatus, however, the modified apparatus illustrated in FIGS. 7 and 8 can be employed for this purpose.

In the modified apparatus illustrated in FIGS. 7 and 8, parts equivalent to those of the apparatus illustrated in FIGS. 1 to 6 are respectively denoted by the same reference numerals and will not be further described.

In the apparatus illustrated in FIGS. 7 and 8, the roller 18 with the circumferential grooves 17 for the gripping bands 14 and 14' is replaced by a pair of parallel rollers 102 and 102' that are not in contact with one another or the idler rollers 6 and 6'. In this case, the gripping bands 14 and 14', like the drive bands 4 and 4' for the support belt 1, do not leave the end caps 5 and 5' at all. Between the gripping bands 14 and 14' on the one hand and the support belt 1 on the other an endless transparent belt 101 is gripped at respective lateral edge regions thereof so that with rotation of the end caps 5 and 5' to cause corresponding rotation of the support belt 1 and the gripping bands 14 and 14' the transparent belt 101 circulates through the cylinder assembly 8 at the same rate as the support belt 1 and side-by-side therewith. The width of the transparent belt 101 is less than the axial distance between the drive bands 4 and 4' for the support belt 1, so that the lateral edge regions of the transparent belt 101 are not actually gripped between these drive bands and the support belt 1.

Outside the cylinder assembly, the endless transparent belt 101 circulates around the pair of rollers 102 and 102' so that an entrance nip 105 is defined where the belts 1 and 101 are drawn together over the roller 6 and an exit nip 106 is defined where these belts diverge from one another over the roller 6'.

A document (or other sheet-form original) 103 which it is desired to scan is pushed forward along a feed-in platform 104 into the entrance nip 105 so that when the belts 1 and 101 are caused to rotate in the sense indicated by the arrow L, the document is drawn between the two belts and carried into the cylinder assembly 8 so as to assume the cylindrically-curved disposition required for scanning of the document by a rotary scanning head (not shown) mounted in the manner described above. After scanning the belts 1 and 101 are circulated once more until the scanned document emerges from the next nip 106 onto a feed-out platform 107. It will be appreciated that the apparatus can be adapted so that a stack of originals at the platform 104 can be fed in sequence automatically through the cylinder assembly 8 to form a stack of used originals at the platform 107. Since with the apparatus illustrated in FIGS. 7 and 8 originals are gripped between the coextensive belts 1 and 101 are not just between the support belt 1 and the gripping bands 14 and 14', there is no lower limit to the size of originals that can be handled by the apparatus.

The endless transparent belt 101 may be made of any suitable transparent plastics material, for example polyester material.

Both the illustrated forms of apparatus may be modified inasmuch as the idler rollers 6 and 6' may be respectively replaced by members providing stationary control surfaces over which the support belt 1 can pass into and out of the cylinder assembly 8.

It will be appreciated that, in cases for example where the support belt 1 is not required to be electrically conductive, the belt may be entirely non-metallic, being composed for example of flexible plastics material e.g. thin terylene. Further, if the belt is of such flexibility that the portions thereof located between adjacent ones of the ribs 3 would tend not to lie flush with those portions of the belt that are directly supported by the ribs, the cage 2 may be replaced by a support structure providing a continuous, cylindrically curved support surface for the belt.

What is claimed is

1. Sheet-support apparatus, comprising:
   an endless support belt;
   a support structure defining a working site having entry and exit locations for the entry and exit, respectively, of a length of sheeting to be supported at the site;
   carrier means mounting the said support belt on the support structure for circulation, from the entry location to the exit location, through the working site, constraining the belt to define a concave support surface for such a length of sheeting at that site, and enabling the belt to circulate back from the exit location to the entry location externally of the working site along a first path; and
   gripping means supported by the said carrier means for simultaneous circulation with the said support belt through the working site adjacent to the said concave support surface and enabling the gripping means to circulate back from the exit location to the entry location externally of the working site along a second path which diverges from the said first path at a sheet-removal location but subsequently converges towards the said first path at a sheet-insertion location, thereby permitting such a length of sheeting to be inserted between the support belt and the gripping means at the sheet-insertion location and carried, held against the support belt by the gripping means, by such simultaneous circulation into the working site to be supported against the said concave support surface.

2. The apparatus of claim 1, wherein the said entry location coincides with the said sheet-insertion location and the said exit location coincides with the said sheet-removal location.

3. The apparatus of claim 1, wherein the said carrier means comprise two support members with like, mutually-coincident cross-sections transverse to the path of the said support belt through the working site, the support belt having opposite lateral edge regions which extend, at the working site, around and against the respective support members.

4. The apparatus of claim 3, wherein the said support members comprise respective coaxially-arranged cylindrical members.

5. The apparatus of claim 4, wherein the said cylindrical members are rotatable and are respectively provided with annular surface portions which drivingly engage respective portions, opposed thereto, of the said lateral edge regions of the support belt for rotation of the belt with the cylindrical members.

6. The apparatus of claim 5, wherein the said annular surface portions are constituted by respective surface portions of drive bands arranged around the respective cylindrical surfaces of the said cylindrical members.

7. The apparatus of claim 1, wherein the said gripping means comprise at least one flexible gripping band arranged to circulate, through the said working site, adjacent to the said concave support surface.

8. The apparatus of claim 6, wherein the said gripping means comprise two flexible gripping bands arranged to circulate, through the said working site adjacent to the said concave support surface, the gripping bands respectively extending around the said cylindrical members for rotation therewith and being located between the said drive bands.

9. The apparatus of claim 1, wherein the said gripping means comprise an endless transparent belt coextensive with the said concave support surface at the said working site.

10. The apparatus of claim 6, wherein the said gripping means comprise an endless transparent belt coextensive with the said concave support surface at the said working site and include two flexible gripping bands which respectively extend around the said cylindrical members for rotation therewith and are arranged to circulate, through the said working site, adjacent to and in contact with that face of the said transparent belt which is adjacent to the said concave support surface, the gripping bands being located between the said drive bands.

11. The apparatus of claim 1, wherein the said support belt is provided with suction-applying apertures enabling a length of sheeting to be drawn against the said concave support surface by suction.

12. The apparatus of claim 1, wherein the support structure includes support means against which non-extreme regions of the support belt are supported at the said working site.

* * * * *